United States Patent [19]

Sannino

[11] Patent Number: 5,612,958
[45] Date of Patent: Mar. 18, 1997

[54] METHOD AND DEVICE FOR THE ASYNCHRONOUS TRANSMISSION OF DATA BY MEANS OF A SYNCHRONOUS BUS

[75] Inventor: Christian Sannino, Vieille Eglise, France

[73] Assignee: Sextant Avionique, Meudon la Foret, France

[21] Appl. No.: 433,918

[22] Filed: May 2, 1995

[30] Foreign Application Priority Data

May 20, 1994 [FR] France .................................. 94 06298

[51] Int. Cl.$^6$ ............................................. H04J 3/24
[52] U.S. Cl. .......................... 370/394; 370/395; 370/412; 371/40.2
[58] Field of Search ..................... 370/94.2, 9.1, 370/60, 85.1, 85.6, 58.2, 85.8, 16; 371/40.1, 40.2, 68.1

[56] References Cited

U.S. PATENT DOCUMENTS

| | | | |
|---|---|---|---|
| 4,744,077 | 5/1988 | Fadem et al. | 370/85 |
| 4,896,316 | 1/1990 | Lespagnol et al. | 370/94.1 |
| 5,367,643 | 11/1994 | Chang et al. | 370/94.2 |
| 5,448,568 | 9/1995 | Delpuch et al. | 370/94.2 |
| 5,479,401 | 12/1995 | Bitz et al. | 370/94.2 |
| 5,513,178 | 4/1996 | Tanaka | 370/94.2 |

*Primary Examiner*—Douglas W. Olms
*Assistant Examiner*—Shick Hom
*Attorney, Agent, or Firm*—Browdy and Neimark

[57] ABSTRACT

A method uses a synchronous bus which ensures the transfer of digital data between plural subscribers connected to the bus via respective couplers. This method comprises the attribution to the subscribers of transmission rights in cells of fixed duration distributed over the frames, the synchronizing of all the couplers, the composing by each coupler of a message comprising the data to be transmitted associated with a code identifying the message, the transmission of this message during a cell attributed to the subscriber, the reception by each coupler of the messages contained in the cells not attributed to it and the analysis of the identification codes of these messages, and if this identification code corresponds to that of the message expected, the transmission of the data in the message to the subscriber.

10 Claims, 2 Drawing Sheets

METHOD AND DEVICE FOR THE ASYNCHRONOUS TRANSMISSION OF DATA BY MEANS OF A SYNCHRONOUS BUS

BACKGROUND OF THE INVENTION

1. Field of the Invention

This invention relates to a data transmission device using a serial bus for the transmission of synchronous data, such as the one defined by the ARINC 659 standard.

It applies notably, though not exclusively, to the transmission of digital data between modules of electronic equipment taken on board aerodynes.

2. Description of the Prior Art

Such a device usually comprises a data transmission bus and couplers which each ensure the connection of an electronic module with the bus and control access to the latter.

The ARINC 659 standard is aimed at specifying an architecture based on a bus, referred to as a "back panel" bus, and bus couplers used in electronic equipment taken on board aerodynes.

According to this standard, the bus comprises four multiplexed and redundant serial data transfer buses enabling transmission errors to be detected and corrected. The couplers have an architecture divided into layers including a layer referred to as "physical" layer, a link layer and a transport layer which ensures the transmission of large volumes of data.

Only the physical and link layers are described by this standard.

Insofar as the physical layer, which groups together the transmission mechanisms and the clock synchronization mechanisms of each coupler, uses the redundancy of the data transmission buses, it has a certain tolerance of faults.

The link layer provides access to the bus and monitors the operations performed by the physical layer. The access principle is essentially based on prior knowledge, on the part of each coupler, of the data exchange traffic on the bus.

To this end, the data is exchanged by means of frames of constant size each comprised of a stream of time windows of variable size during which each coupler takes the initiative of transmitting or receiving a message. This initiative is taken in reference to a table associated with each coupler and defined at the time of designing the device. This table notably mentions the direction of the exchange, the size of the window and the type of data exchanged in this window.

This architecture has the drawback of lacking flexibility since, when one wishes to change the system and in particular the type of data exchanged, the contents of each of the tables associated with the couplers connected to the bus must be revised.

Moreover, at present, a new technique for asynchronous transport of digital data has been implemented to operate telecommunications networks.

This technique, known as ATM (Asynchronous Transfer Mode), is based on the switching of cells of fixed size. According to this transmission mode, the cells are identified by a "virtual channel" number and not by their position in time or rank in a periodical frame, as is the case with synchronous transmission. There is therefore no connection between the data contained in the cells and time.

Each cell thus contains a header containing the virtual channel number and a data field.

These cells are transmitted by time-division multiplexing on the transmission links.

The fundamental advantage of this transmission mode over the synchronous techniques lies in the flexibility of the multiplexing which does not have a rigid, deterministic structure relating to quantified thruputs.

OBJECT OF THE INVENTION

The main object of this invention is to combine the respective advantages of the synchronous bus specified by the ARINC 659 standard, and of the mode of asynchronous communication by cells of fixed size.

SUMMARY OF THE INVENTION

Accordingly, there is provided a method for transferring digital data between plural subscribers connected via respective couplers to a bus comprising four redundant data transfer buses enabling transmission errors to be detected and corrected, the data transmitted being spread out over time frames of fixed duration.

This method is characterized in that each frame is divided into cells of fixed duration comprising a header intended to notably receive a message identification code, said method comprising:

- the attribution to the subscribers of transmission rights in the cells constituting said frame,
- the synchronizing of all the subscriber couplers with one another,
- the composing, by a subscriber, of a message comprising the data to be transmitted associated with a code identifying the message, and the transmission of this message during a cell attributed to the subscriber,
- the reception by each subscriber coupler of the messages contained in the cells not attributed to it, the analysis of the identification code of each message received, and, if this identification code corresponds to that of a message expected by the subscriber, the transmission to the subscriber of the data contained in this message.

Thus, the tolerance of failure conferred by the ARINC 659 bus is preserved, to the extent that this method provides sufficient security to be applicable to the electronic equipment taken on board aerodynes.

Furthermore, by way of the utilisation of cells of fixed duration, the contents of the tables associated with each coupler and defined by the ARINC 659 standard have been considerably simplified since, according to this method, these tables now only mention, for a subscriber and for each cell, this subscriber's right to transmit in this cell. In order to build these tables, it is sufficient to simply divide up the cells of the frame, i.e. the available pass-band, between the subscribers. These tables, and therefore the transmission rights granted to a subscriber, must only be modified in the event of a modification of the passband allocated to a subscriber and of a modification of the type of data to be transmitted.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENT

Figure 1:
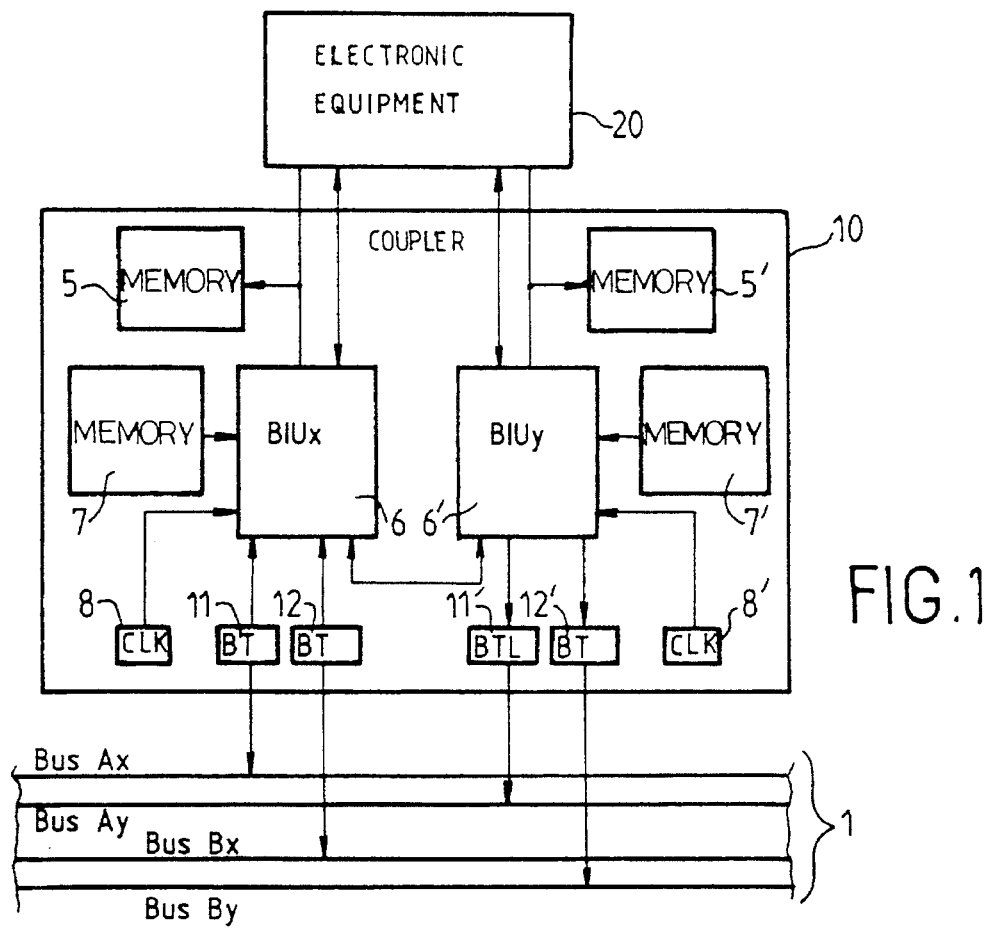
FIG. 1 schematically represents the hardware architecture of a bus coupler embodying the invention.

FIG. 1 represents the hardware architecture of a coupler 10 ensuring the connection between an item of electronic equipment 20 and a bus 1 of the ARINC 659 type.

The bus 1 comprises four redundant buses Ax, Ay, Bx, By each comprised of two multiplexed serial data transfer lines and one synchronizing clock signal transport line, the even and odd data bits being respectively divided out onto each of the two data transport lines of each redundant bus.

This bus structure provides the data transfer with both a high level of security and high speeds, e.g. 60 Mbits/s.

On this so-called back panel bus 1, electronic modules 20 are connected via couplers 10.

Such a coupler 10 also has a redundant structure. It comprises two bus interfacing circuits 6, 6' each connected to a memory 7, 7', a clock 8, 8', and two bus transmitters 11, 12 or 11', 12' respectively ensuring the interface with two of the four buses Ax, Ay, Bx, By. These two interfacing circuits 6, 6' are interconnected so as to be able to ensure all the consistency checks and error corrections authorized by the use of four redundant buses.

Furthermore, the two interfacing circuits 6, 6' are each connected to the module 20 and to a dual port memory 5, 5' that can also be accessed by the electronic module 20.

They are designed so that the utilisation time of the bus 1 is shared into time cells or windows of constant duration which can be attributed to the different users of the bus 1.

Figure 2:
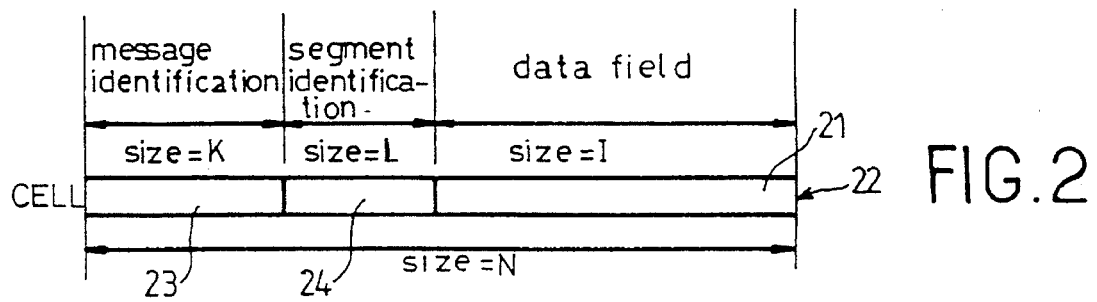
FIG. 2 shows the structure of a cell.

According to FIG. 2, a cell 22 comprises a field 21 reserved for data, of size I e.g. equal to 48 bytes if compliance with the ATM cell format is required, a header notably comprising a message identification code 23 of size K and a segment identification code 24 of size L, L and K each being equal to e.g. 2 bytes.

In order for the attribution of the cells to the different modules 20 connected to the bus 1 to be repetitive, the cells are divided up into a frame of constant duration in which the order of attribution of the cells to the modules is invariable. In order to achieve greater flexibility, several frames can be provided containing the same number of cells but in which the cells are attributed differently to the modules 20.

Figure 3:
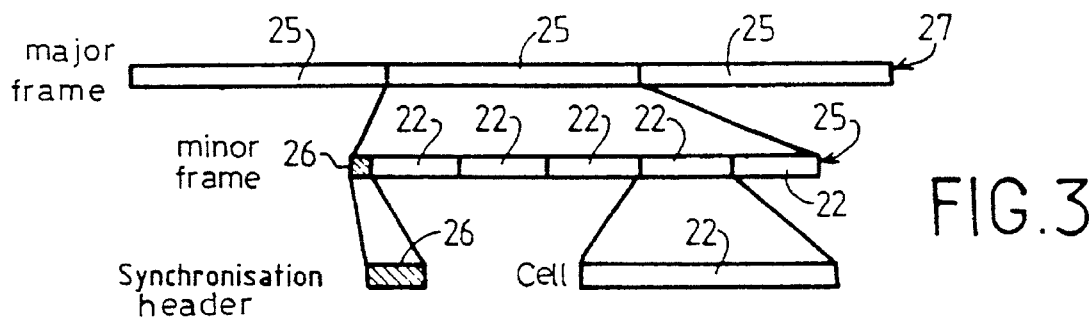
FIG. 3 represents the composition of a frame.

Thus, in FIG. 3, these cells are divided up into minor frames 25 comprising a predetermined number of cells and a synchronization header 26, the minor frames being in turn grouped into major frames 27 of fixed duration.

The synchronization header 26 of the minor frames enables each coupler connected to the bus 1 to synchronize its clocks 8, 8' with those of the other couplers and with the clock signals traveling on the bus in order to able to start a read or write operation on the bus 1 at exactly the start of a cell.

From the functional point of view (FIG. 4), the architecture of a coupler 10, 10' can be broken down into three layers, namely a physical layer 2, 2' which transfers data between the bus 1 and the coupler 10, 10', a link layer 3, 3' and a transport layer 4, 4' which establishes the link between the coupler 10 and an electronic module 20, 20'.

Figure 4:
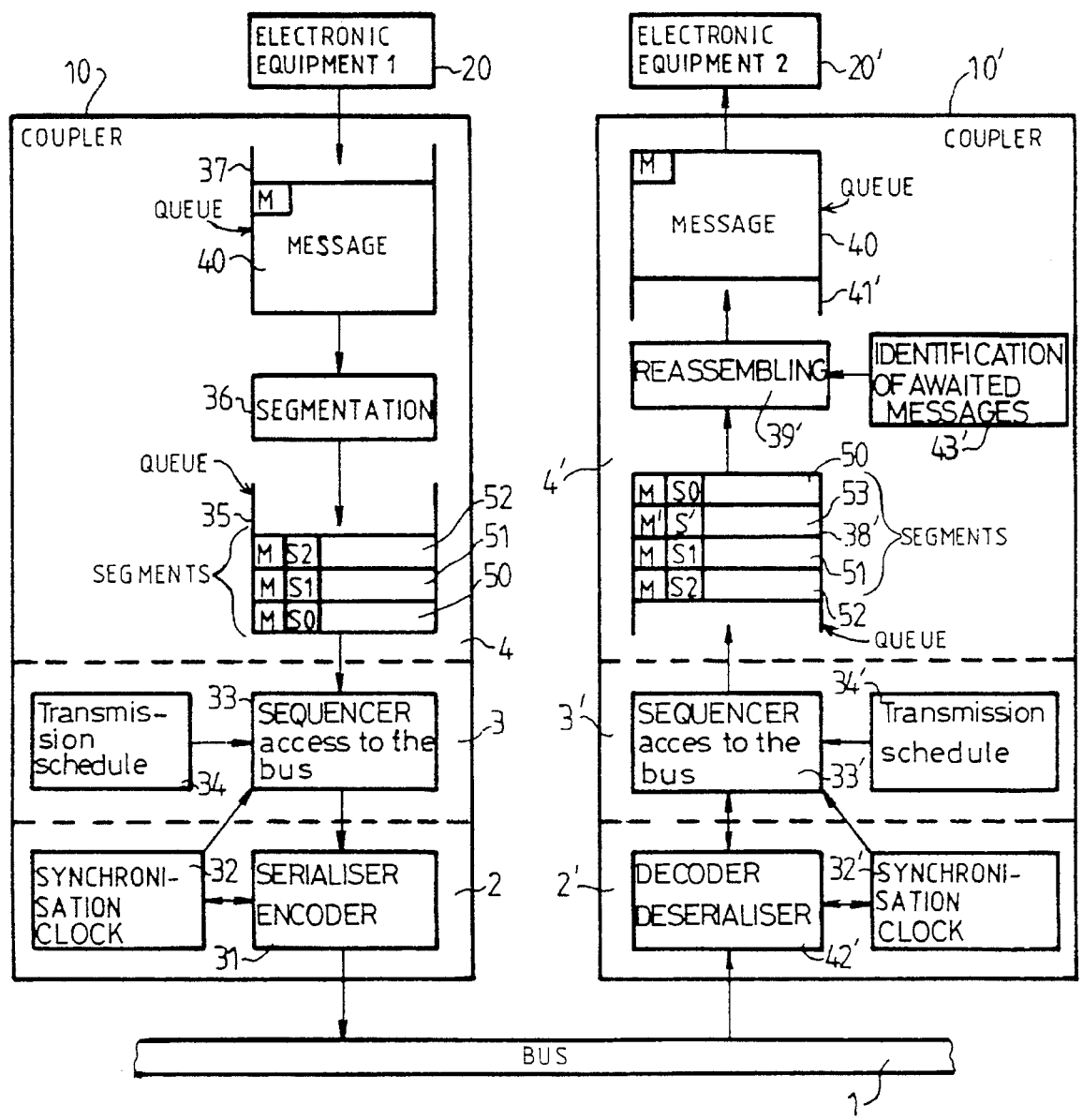
FIG. 4 schematically represents the functional architecture of the bus coupler.

For the purposes of clarity, only the elements of the couplers 10, 10' serving either for the transmission or reception of messages have been represented in this FIG. 4.

It goes without saying that each coupler 10, 10' comprises both the elements serving for transmission and for reception.

For transmission, the transport layer 4 comprises a queue 37, e.g. of the FIFO type, that can be accessed for writing by the module 20 so as to transfer there the messages 40 it wishes to transmit to another module 20'. These messages comprise a header containing an identification code M in order for the destination module 20' to be able to recognize it. The queue 37 can be accessed for reading by a segmentation unit 36 whose role it is to segment the messages to be transmitted of whatever size into blocks of size compatible with that of the cells. This unit retrieves the identification code M of the message 40 and associates a header containing this identification code with each data block, as well as a segment number S0, S1, S2 in order to constitute the segments 50 to 52 of format corresponding to that of a cell such as represented in FIG. 2.

These segments 50 to 52 are transferred, in the order in which they were constituted, into a second queue 35, also of the FIFO type.

The link layer 3 comprises a sequencer 33 of access to the bus which, by means of a transmission schedule 34 contained in the memory 5, 5', is capable of determining the moment a cell attributed to it starts on the bus, i.e. a cell in which it has the right to transmit a segment. The schedule thus brings together all the transmission rights attributed to a module.

This schedule comprises a string of bits of number corresponding to the number of cells 22 in each minor frame 25 multiplied by the number of minor frames 25 in each major frame 27, the bits at "1" indicating e.g. that the corresponding cell has been attributed to the module 20.

When the sequencer 33 detects on the bus a cell that has been attributed to it, it transfers the first segment 50 from the queue 35 to the physical layer 2 of the coupler 10.

In the physical layer 2, the segments 50 to 52 coming from the link layer 3 are processed by a parallel-to-series converter/encoder 31 which converts the segment to be transmitted into a serial format compatible with the specifications of the bus 1, and applies it to the latter.

Furthermore, the physical layer 2 comprises a synchronizing circuit 32, 32' which picks up the frame synchronizing pulses 26 traveling on the bus 1 and sends them to the access sequencer 11 to synchronize the latter with the concatenation of minor frames traveling on the bus 1.

For reception, this physical layer 2' comprises a decoder/series-to-parallel converter 42' which, on request from the access sequencer 33', picks up all the segments contained in the cells traveling on the bus, decodes them and sends them to the access sequencer 33' via a parallel link.

At the level of the link layer 3', the access sequencer 33' commands reception of the contents of the cells traveling on the bus 1 as a function of the transmission schedule 34', i.e. when the coupler 10' is not transmitting.

All the data segments 50 to 53 received by the access sequencer 33' are transferred by the transport layer 4' into a third queue 38' of the same type as the others. This queue is emptied by a message reassembly unit 39' which has a sorting function for the data segments 50 to 53 received and a function for reconstituting messages as they were transmitted by the transmitting module 20 to the associated coupler 10.

As all the segments traveling on the bus 1 and not transmitted by the sequencer 33' are systematically transferred into the queue 38', a sorting must be performed and all the segments 53 whose identification code M' contained in the header is not recognized must be rejected. For this purpose, the memory 5, 5' contains a list 43' of all the identification codes of the messages expected by the module 20'.

The segment numbers S0, S1, S2 contained in the header are then used by the reassembly unit 39' to reconstitute the initial message 40 to which it adds the identification code M, and to detect any missing segments.

The message 40 thus reconstituted is transferred into a fourth queue 41' in order to make it available for the destination module 20'.

The segmenting 36, reassembly 39', access sequencing 33, 33', decoding/series-to-parallel converting 42' and parallel-to-series converting/encoding 31 functions are grouped together in each interfacing unit 6, 6'. Moreover, each memory 5, 5' contains the transmission schedule 34, 34' and the list 43' of identification codes of the messages expected. This memory 5, 5' can not only be accessed by the interfacing unit 6, 6' but also by the module 20, 20' in order to be updated. Each memory 7, 7' groups together the queues 37, 41' containing the messages 40 received or to be transmitted as well as the queues 35, 38' containing the segments 50 to 53 received or to be transmitted.

As all the functional elements of this architecture are duplicated to produce the redundant architecture shown in FIG. 1, the active elements, such as the access sequencer 33, 33', exchange signals with their counterparts so as to check the consistency of the data traveling on the four buses Ax, Ay, Bx, By and to correct the errors, in accordance with the ARINC 659 standard.

Advantageously, the transmission schedule 34, 34' indicates, for each cell 22 of the major frame 27 attributed to the module, a level of priority of attribution, e.g. 4, 3, 2 or 1, whereby a same cell can be attributed to several modules with different priorities. In this manner, if a cell is not used by the module of higher priority, it can then be used by a lower ranked module.

This mechanism enables account to be taken of the case of modules with low requirements in terms of pass-band but, conversely, having messages to be transmitted with a minimum of latency.

I claim:

1. A method for transmitting digital data between plural subscribers independent from one another and connected via respective couplers to a common synchronous bus comprising four redundant data transfer buses enabling transmission errors to be detected and corrected, the bus having a use time divided into cyclic time frames of fixed duration, each frame being divided into cells of fixed duration, said method comprising an initial configuration phase of attributing each of said couplers exclusive rights of transmission in the cells of each cyclic frame, and a phase of exchanging information between said subscribers performed by each of said couplers and comprising the steps of:

synchronizing the coupler with said cyclic frames and cells, detecting occurrences of cells attributed to said coupler and transmitting during said cells messages composed by the subscriber connected to said coupler and comprising digital data to be transmitted associated with a code identifying the message, detecting occurrences of cells not attributed to said coupler and receiving messages transmitted during said cells, analysing the identification code of each message received, and, if this identification code corresponds to that of a message expected by the subscriber connected to said coupler, transmitting the message to said subscriber.

2. The method as claimed in claim 1, wherein each cell comprises a header intended to receive said message identification code and a segment number, and a data zone reserved for transmitting said digital data.

3. The method as claimed in claim 2, further comprising:

dividing the digital data of the message to be transmitted by a subscriber into blocks of size equal to the size of said data zone, said blocks being numbered consecutively as a function of their respective position in said message, associating each data block with a header containing the identification code of said message and its number in order to constitute a segment having a size corresponding to that of each cell, and transmitting on said bus each segment in said cells attributed to said subscriber, reconstituting by at least one subscriber coupler a message from received segments containing a same identification code, and from said segment numbers, and checking that all the received segments constituting said message have been received.

4. The method as claimed in claim 1, wherein the frames of fixed duration and sub-divided into cells are minor frames grouped together into a major frame of fixed duration, each minor frame comprising a synchronizing signal intended to synchronize the couplers connected to said bus.

5. The method as claimed in claim 4, wherein said cells of said major frame are attributed to said subscribers by means of a transmission table specific to each subscriber and indicating, for each cell of said major frame, whether or not the cell has been attributed to said subscriber.

6. The method as claimed in claim 5, wherein said transmission table further indicates a level of priority for each cell attributed to said subscriber.

7. A device for transmitting digital data between plural electronic modules independent from one another and connected via respective couplers to a common synchronous bus comprising two pairs of redundant data transfer buses enabling transmission errors to be detected and corrected, the bus having a use time divided into cyclic time frames of fixed duration, each frame being divided into cells of fixed duration, each coupler having a redundant structure comprising two bus interfacing units connected respectively to said two pairs of data transfer buses, these interfacing units being interconnected so as to be able to check the consistency of signals traveling on said pairs of buses and to correct any errors, each interfacing unit being connected to a clock, a first memory, and a second memory containing a table indicating the cells of each of said cyclic frames during which the coupler has exclusive transmission rights, and a list of message identification codes expected by the electronic module connected to said coupler, each of said interfacing units comprising:

means for synchronizing said clock with said cyclic frames and cells, means for detecting occurrences of cells attributed in said table to said coupler, and means for transmitting during said cells messages composed by the electronic module connected to said coupler and comprising digital data to be transmitted associated with a code identifying the message, means for detecting occurrences of cells not attributed in said table to said coupler and means for receiving messages transmitted during said cells, means for comparing the identification code of each message received with the codes contained in said list, and means for transmitting the message to said module if its identification code is contained in said list.

8. The device as claimed in claim 7, wherein said first memory comprises a first queue containing the messages to be transmitted on said bus, and a second queue containing the messages received.

9. The device as claimed in claim 8, wherein each of said interfacing units further comprises:

means for dividing the digital data of a message contained in said first queue into segments having a size corresponding to that of each cell and comprising a header and a data zone, said data zone receiving a part of said digital data, and said header receiving the identification code of said message and a segment number determining the position of said part in the message, said segments being transmitted on said bus in said cells attributed to said coupler, means for reconstituting a message from segments received in the cells not attributed to the coupler and containing a same identification code corresponding to a code of said list, and from said segment numbers, and means for checking that all the received segments constituting said message have been received, said first memory further comprising a third queue containing the segments to be transmitted on said bus, and a fourth queue containing the segments received and destined for said module.

10. The device as claimed in claim 7, wherein said second memory can be accessed by said module in order to update said table of frame cells attributed for transmission to said coupler, and the list of message identification codes expected by said module.

* * * * *